(12) United States Patent
Shaheen et al.

(10) Patent No.: US 8,718,688 B2
(45) Date of Patent: May 6, 2014

(54) METHOD AND APPARATUS FOR SOLVING LIMITED ADDRESSING SPACE IN MACHINE-TO-MACHINE (M2M) ENVIRONMENTS

(75) Inventors: Kamel M. Shaheen, King of Prussia, PA (US); Samian Kaur, Conshohocken, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 601 days.

(21) Appl. No.: 12/870,026

(22) Filed: Aug. 27, 2010

(65) Prior Publication Data
US 2011/0053619 A1   Mar. 3, 2011

Related U.S. Application Data

(60) Provisional application No. 61/237,421, filed on Aug. 27, 2009.

(51) Int. Cl.
*H04W 4/00* (2009.01)

(52) U.S. Cl.
USPC .......................................... 455/466; 370/328

(58) Field of Classification Search
CPC ............................... H04W 4/005; H04W 80/04
USPC ....................................................... 455/466
See application file for complete search history.

(56) References Cited

U.S. PATENT DOCUMENTS

| | | | | |
|---|---|---|---|---|
| 5,914,958 A * | 6/1999 | Chinitz et al. | ................. | 370/441 |
| 6,039,624 A * | 3/2000 | Holmes | .......................... | 455/403 |
| 6,115,388 A * | 9/2000 | Chinitz et al. | ................. | 370/441 |
| 6,134,443 A * | 10/2000 | Spann et al. | ................... | 455/450 |
| 6,259,906 B1 * | 7/2001 | Carlsson et al. | ............... | 455/403 |
| 6,480,715 B1 * | 11/2002 | Pentikainen | ................... | 455/433 |
| 6,522,886 B1 * | 2/2003 | Youngs et al. | ................. | 455/450 |
| 6,600,928 B1 * | 7/2003 | Ahya et al. | ..................... | 455/518 |
| 6,647,416 B1 * | 11/2003 | Lorian et al. | ................... | 709/224 |
| 6,907,227 B2 * | 6/2005 | Fujioka | ......................... | 455/41.3 |
| 6,975,862 B1 * | 12/2005 | Garland et al. | ............... | 455/433 |
| 6,990,011 B2 * | 1/2006 | McClure | ....................... | 365/154 |
| 6,996,410 B2 * | 2/2006 | Bos et al. | ....................... | 455/466 |
| 7,072,656 B2 * | 7/2006 | Willars et al. | ................. | 455/436 |
| 7,096,018 B2 * | 8/2006 | Mikami | ...................... | 455/435.1 |
| 7,218,915 B2 * | 5/2007 | Craven | ........................... | 455/411 |
| 7,266,383 B2 * | 9/2007 | Anderson | ..................... | 455/518 |
| 7,446,655 B2 * | 11/2008 | Jha et al. | .................... | 340/539.13 |
| 7,580,714 B2 * | 8/2009 | Hurtta | ............................ | 455/450 |

(Continued)

FOREIGN PATENT DOCUMENTS

| | | |
|---|---|---|
| EP | 1 330 138 | 7/2003 |
| WO | 01/31964 | 5/2001 |

OTHER PUBLICATIONS

Lin et al., "A push mechanism for GPRS supporting private IP addresses," IEEE Communications Letters, vol. 7, Issue 1, pp. 24-26 (Jan. 2003).

(Continued)

*Primary Examiner* — Hai V Nguyen

(74) *Attorney, Agent, or Firm* — Volpe and Koenig, P.C.

(57) ABSTRACT

A method and apparatus for machine-to-machine (M2M) communications between a controller and a group of wireless transmit/receive units (WTRUs), each WTRU within the group having a same international mobile subscriber identity (IMSI).

11 Claims, 5 Drawing Sheets

(56) References Cited

U.S. PATENT DOCUMENTS

| | | | | |
|---|---|---|---|---|
| 7,587,591 | B2* | 9/2009 | Lebovitz et al. | 713/163 |
| 7,680,109 | B2* | 3/2010 | Lundin et al. | 370/390 |
| 7,742,765 | B2* | 6/2010 | Israelsson et al. | 455/436 |
| 7,774,008 | B2* | 8/2010 | Benaouda et al. | 455/466 |
| 7,783,776 | B2* | 8/2010 | Nimour | 709/235 |
| 7,813,731 | B2* | 10/2010 | Park | 455/435.1 |
| 7,882,217 | B2* | 2/2011 | Katzir | 709/224 |
| 7,912,464 | B2* | 3/2011 | Jiang | 455/432.1 |
| 7,970,425 | B2* | 6/2011 | Balachandran et al. | 455/519 |
| 7,979,070 | B2* | 7/2011 | Hurtta | 455/435.2 |
| 8,072,948 | B2* | 12/2011 | Shaheen | 370/338 |
| 8,077,677 | B2* | 12/2011 | Wang et al. | 370/332 |
| 8,112,523 | B2* | 2/2012 | Van Elburg et al. | 709/225 |
| 8,134,978 | B2* | 3/2012 | Purkayastha et al. | 370/332 |
| 8,135,386 | B2* | 3/2012 | Schneyer et al. | 455/411 |
| 8,175,096 | B2* | 5/2012 | Isobe | 370/392 |
| 8,184,623 | B2* | 5/2012 | Barriga et al. | 370/352 |
| 8,185,629 | B2* | 5/2012 | Hoeksel | 709/225 |
| 8,201,164 | B2* | 6/2012 | Reus et al. | 717/177 |
| 8,219,090 | B2* | 7/2012 | Hosain et al. | 455/435.2 |
| 8,249,015 | B2* | 8/2012 | Kaur et al. | 370/331 |
| 8,300,649 | B2* | 10/2012 | Couaillet et al. | 370/401 |
| 8,340,670 | B2* | 12/2012 | Shaikh et al. | 455/435.1 |
| 8,379,657 | B2* | 2/2013 | Lim et al. | 370/401 |
| 8,412,825 | B2* | 4/2013 | Van Elburg et al. | 709/225 |
| 8,433,900 | B2* | 4/2013 | Lebovitz et al. | 713/163 |
| 8,446,847 | B2* | 5/2013 | Li et al. | 370/271 |
| 8,463,264 | B2* | 6/2013 | Alriksson et al. | 455/435.1 |
| 2002/0123348 | A1* | 9/2002 | Willars et al. | 455/436 |
| 2002/0142805 | A1* | 10/2002 | Pecen et al. | 455/558 |
| 2003/0013443 | A1* | 1/2003 | Willars et al. | 455/432 |
| 2004/0087319 | A1* | 5/2004 | Bos et al. | 455/458 |
| 2005/0075106 | A1* | 4/2005 | Jiang | 455/432.3 |
| 2005/0096087 | A1* | 5/2005 | Kim | 455/558 |
| 2005/0138369 | A1* | 6/2005 | Lebovitz et al. | 713/163 |
| 2006/0003775 | A1* | 1/2006 | Bull et al. | 455/456.1 |
| 2006/0171369 | A1* | 8/2006 | Ostrup et al. | 370/349 |
| 2007/0105557 | A1* | 5/2007 | Israelsson et al. | 455/436 |
| 2007/0169107 | A1* | 7/2007 | Huttunen | 717/174 |
| 2007/0183333 | A1* | 8/2007 | Kaur et al. | 370/236.2 |
| 2007/0195803 | A1* | 8/2007 | Lowery et al. | 370/401 |
| 2007/0259675 | A1* | 11/2007 | Worrall | 455/458 |
| 2008/0026726 | A1* | 1/2008 | Tariq et al. | 455/411 |
| 2008/0026777 | A1 | 1/2008 | Van der Gaast et al. | |
| 2008/0089293 | A1* | 4/2008 | Madour et al. | 370/331 |
| 2008/0153521 | A1* | 6/2008 | Benaouda et al. | 455/466 |
| 2008/0182596 | A1* | 7/2008 | Wang et al. | 455/458 |
| 2008/0254834 | A1* | 10/2008 | Liu | 455/558 |
| 2008/0285464 | A1* | 11/2008 | Katzir | 370/241 |
| 2009/0125996 | A1* | 5/2009 | Guccione et al. | 726/6 |
| 2009/0191857 | A1* | 7/2009 | Horn et al. | 455/419 |
| 2009/0191919 | A1* | 7/2009 | Kawamura | 455/558 |
| 2009/0201879 | A1* | 8/2009 | Purkayastha et al. | 370/331 |
| 2009/0204713 | A1* | 8/2009 | Beziot et al. | 709/228 |
| 2009/0217038 | A1* | 8/2009 | Lehtovirta et al. | 713/156 |
| 2009/0217348 | A1* | 8/2009 | Salmela et al. | 726/2 |
| 2009/0298518 | A1* | 12/2009 | Busropan et al. | 455/466 |
| 2009/0318191 | A1* | 12/2009 | Montes | 455/558 |
| 2010/0057485 | A1* | 3/2010 | Luft | 705/1 |
| 2010/0106967 | A1* | 4/2010 | Johansson et al. | 713/158 |
| 2010/0128685 | A1* | 5/2010 | Jiang | 370/329 |
| 2010/0177663 | A1* | 7/2010 | Johansson et al. | 370/254 |
| 2010/0227588 | A1* | 9/2010 | Bradley | 455/411 |
| 2010/0273462 | A1* | 10/2010 | Thorn et al. | 455/414.1 |
| 2010/0323695 | A1* | 12/2010 | Kallio et al. | 455/435.2 |
| 2011/0014939 | A1* | 1/2011 | Ravishankar et al. | 455/515 |
| 2011/0016321 | A1* | 1/2011 | Sundaram et al. | 713/171 |
| 2011/0035584 | A1* | 2/2011 | Meyerstein et al. | 713/155 |
| 2011/0053619 | A1* | 3/2011 | Shaheen et al. | 455/466 |
| 2011/0099605 | A1* | 4/2011 | Cha et al. | 726/3 |
| 2011/0110379 | A1* | 5/2011 | Lim et al. | 370/401 |
| 2011/0128911 | A1* | 6/2011 | Shaheen | 370/328 |
| 2011/0136482 | A1* | 6/2011 | Kaliner | 455/418 |
| 2011/0161503 | A1* | 6/2011 | Krebs | 709/227 |
| 2011/0222514 | A1* | 9/2011 | Couaillet et al. | 370/338 |
| 2011/0244907 | A1* | 10/2011 | Golaup et al. | 455/509 |
| 2011/0265158 | A1* | 10/2011 | Cha et al. | 726/6 |
| 2012/0004003 | A1* | 1/2012 | Shaheen et al. | 455/509 |
| 2012/0077497 | A1* | 3/2012 | Shaheen | 455/435.1 |
| 2012/0088550 | A1* | 4/2012 | Tiwari | 455/557 |
| 2012/0089727 | A1* | 4/2012 | Raleigh et al. | 709/224 |
| 2012/0110145 | A1* | 5/2012 | Pinheiro et al. | 709/220 |
| 2012/0196570 | A1* | 8/2012 | Lindholm et al. | 455/411 |
| 2012/0214520 | A1* | 8/2012 | Bergqvist et al. | 455/458 |
| 2012/0246481 | A1* | 9/2012 | Guccione et al. | 713/176 |
| 2012/0275348 | A1* | 11/2012 | Zhou et al. | 370/259 |
| 2012/0284775 | A1* | 11/2012 | Betti et al. | 726/3 |
| 2012/0296968 | A1* | 11/2012 | Lin et al. | 709/204 |
| 2012/0311335 | A1* | 12/2012 | Fransen | 713/170 |
| 2013/0005273 | A1* | 1/2013 | Kips et al. | 455/67.11 |
| 2013/0005387 | A1* | 1/2013 | Aso et al. | 455/517 |
| 2013/0007231 | A1* | 1/2013 | Forssell | 709/221 |
| 2013/0021970 | A1* | 1/2013 | Lei | 370/328 |
| 2013/0035067 | A1* | 2/2013 | Zhang et al. | 455/411 |
| 2013/0044646 | A1* | 2/2013 | Qu et al. | 370/259 |
| 2013/0080782 | A1* | 3/2013 | Rajadurai et al. | 713/171 |
| 2013/0107702 | A1* | 5/2013 | Gupta et al. | 370/230 |
| 2013/0136072 | A1* | 5/2013 | Bachmann et al. | 370/329 |
| 2013/0142173 | A1* | 6/2013 | Lim et al. | 370/331 |
| 2013/0155948 | A1* | 6/2013 | Pinheiro et al. | 370/328 |
| 2013/0203411 | A1* | 8/2013 | Cheng, Tsung-Yo | 455/435.1 |
| 2013/0223369 | A1* | 8/2013 | Nenner et al. | 370/329 |

OTHER PUBLICATIONS

Third Generation Partnership Project, "Technical Specification Group Services and System Aspects; Study on Facilitating Machine to Machine Communication in 3GPP Systems (Release 8)," 3GPP TR 22.868 v8.0.0 (Mar. 2007).

Third Generation Partnership Project, "Technical Specification Group Core Network; Numbering, Addressing and Identification (Release 4)," 3GPP TS 23.003 v4.9.0 (Sep. 2006).

Third Generation Partnership Project, "Technical Specification Group Core Network; Numbering, Addressing and Identification (Release 5)," 3GPP TS 23.003 v5.11.0 (Jun. 2006).

Third Generation Partnership Project, "Technical Specification Group Core Network; Numbering, Addressing and Identification (Release 6)," 3GPP TS 23.003 v6.16.0 (Mar. 2009).

Third Generation Partnership Project, "Technical Specification Group Core Network; Numbering, Addressing and Identification (Release 7)," 3GPP TS 23.003 v7.9.0 (Mar. 2009).

Third Generation Partnership Project, "Technical Specification Group Core Network; Numbering, Addressing and Identification (Release 8)," 3GPP TS 23.003 v8.5.0 (Jun. 2009).

Third Generation Partnership Project, "Technical Specification Group Core Network; Numbering, Addressing and Identification (Release 8)," 3GPP TS 23.003 v8.9.0 (Jun. 2010).

Third Generation Partnership Project, "Technical Specification Group Core Network; Numbering, Addressing and Identification (Release 9)," 3GPP TS 23.003 v9.3.0 (Jun. 2010).

Third Generation Partnership Project, "Technical Specification Group Services and System Aspects; General Packet Radio Service (GPRS); Service Description; Stage 2 (Release 9)," 3GPP TS 23.060 v9.1.1 (Jun. 2009).

Third Generation Partnership Project, "Technical Specification Group Services and System Aspects; General Packet Radio Service (GPRS); Service Description; Stage 2 (Release 9)," 3GPP TS 23.060 v9.5.0 (Jun. 2010).

Third Generation Partnership Project, "Technical Specification Group Services and System Aspects; General Packet Radio Service (GPRS); Service Description; Stage 2 (Release 10)," 3GPP TS 23.060 v10.0.0 (Jun. 2010).

* cited by examiner

METHOD AND APPARATUS FOR SOLVING LIMITED ADDRESSING SPACE IN MACHINE-TO-MACHINE (M2M) ENVIRONMENTS

CROSS REFERENCE TO RELATED APPLICATIONS

This application claims the benefit of U.S. Provisional Application Ser. No. 61/237,421 filed on Aug. 27, 2009, the contents of which is hereby incorporated by reference herein.

BACKGROUND

Machine-to-Machine (M2M) communication (also referred to as "machine-type communications" or "MTC") may be seen as a form of data communication between entities that do not necessarily need human interaction.

M2M communication may be used in a variety of areas such as: security, tracking/tracing, healthcare, remote maintenance/control and metering. M2M communication may be used in surveillance systems, order management, gaming machines and remote monitoring of vital signs. M2M communication may be used in programmable logic controllers (PLCs), sensors, lighting, vending machine control and in applications related to power, gas, water, heating, grid control, and industrial metering. Additionally, M2M communication based on machine type communication (MTC) technology may be used in areas such as customer service.

Depending on its implementation, M2M communication may be different from some current communication models. For example, M2M communication may a large number of WTRUs, and/or may involve very little traffic per WTRU. Additionally, relative to some current technologies, M2M communication may involve lower costs and less effort to deploy.

M2M communications may take advantage of deployed wireless networks based on Third Generation Partnership Project (3GPP) technologies such as Global System for Mobile Communications (GSM), Universal Mobile Telecommunications System (UMTS), Long Term Evolution (LTE), and/or other technologies such as those developed by the Institute of Electrical and Electronics Engineers (IEEE) and 3GPP2. M2M communications may use networks based on these technologies to deliver business solutions in a cost-effective manner. In a circumstance involving ubiquitous deployment of wireless networks, the availability of the wireless networks may facilitate and/or encourage the deployment and use of M2M WTRUs. Additionally, further enhancements to these technologies may provide additional opportunities for the deployment of M2M-based solutions.

SUMMARY

A method and apparatus for machine-to-machine (M2M) communications between a controller and a group of wireless transmit/receive units (WTRUs), each WTRU within the group having a same international mobile subscriber identity (IMSI).

BRIEF DESCRIPTION OF THE DRAWINGS

A more detailed understanding may be had from the following description, given by way of example in conjunction with the accompanying drawings wherein.

DETAILED DESCRIPTION

Figure 1A:
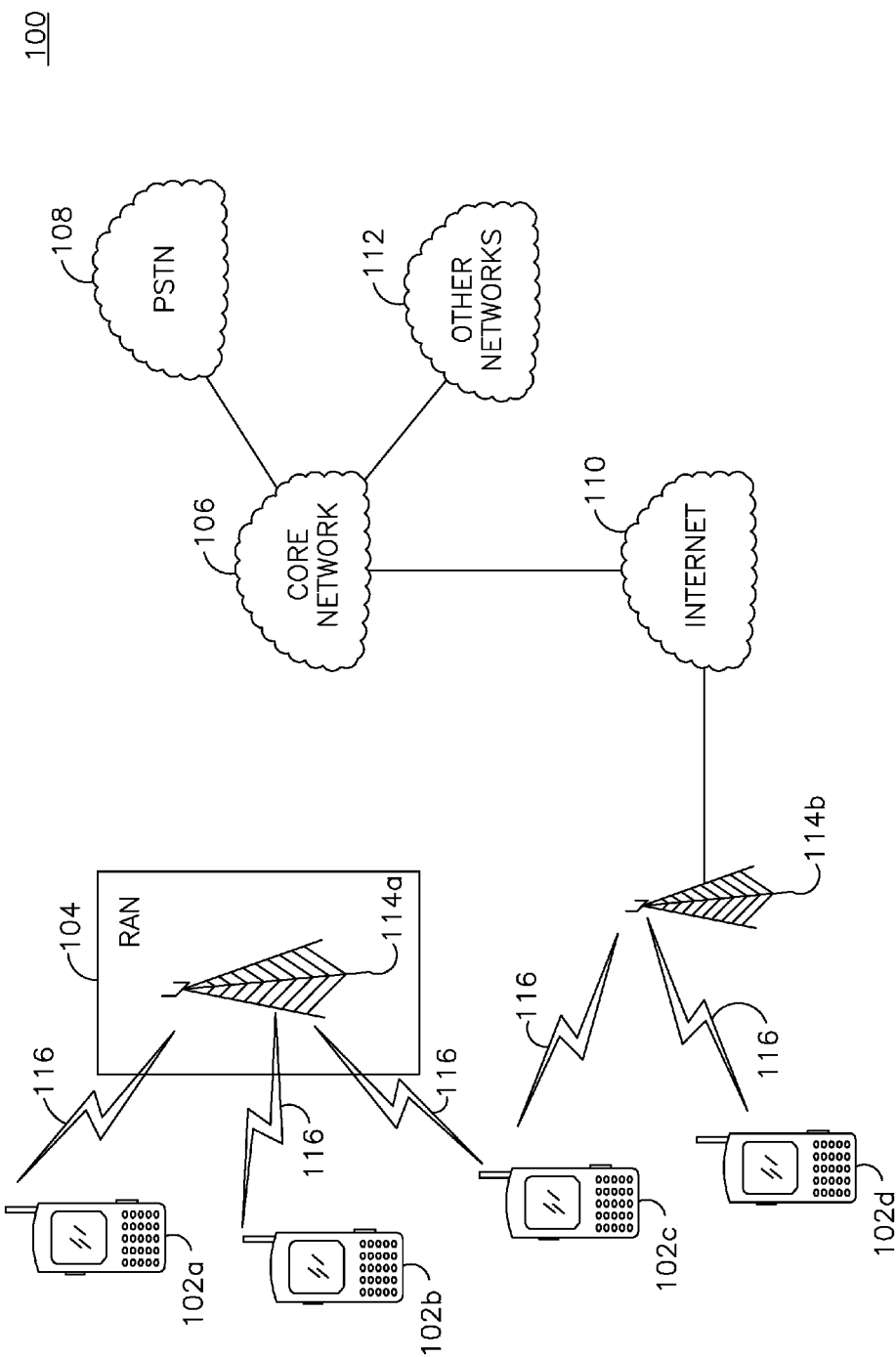
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, a media transfer protocol (MTC) device, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
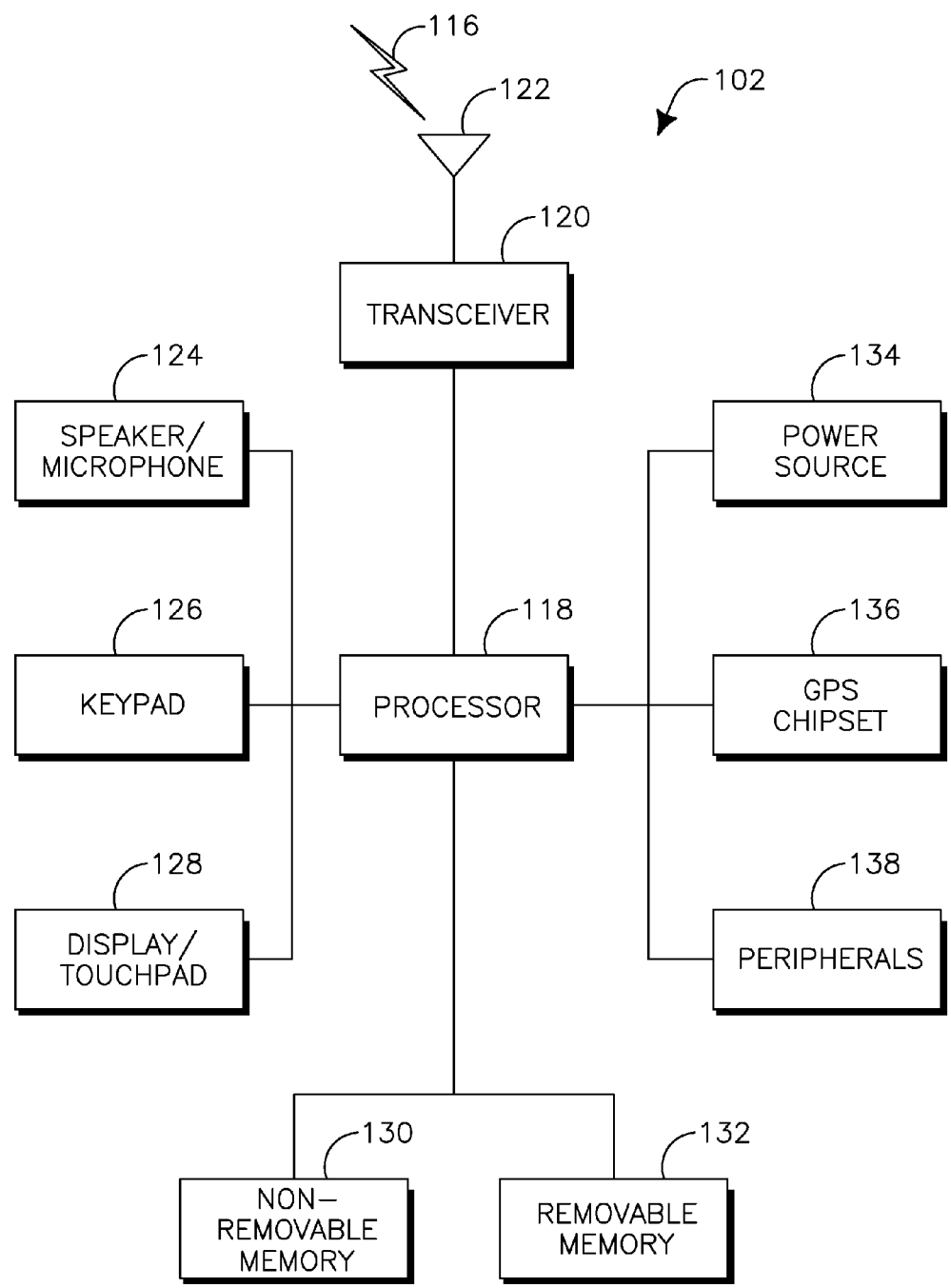
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

The growing number of Machine-to-Machine (M2M) devices has increased traffic load including the number of operational and signaling procedures. M2M devices may leverage existing mobile communications including functions such as initiation, paging, general control and addressing. Addressing is an issue due to the large number of devices using M2M services in a mobile environment. Addressing may be based on an international mobile subscriber identity (IMSI), which is a unique number associated with GSM and UMTS network mobile phone users. The IMSI is stored in the SIM inside a wireless transmit/receive unit (WTRU) and is sent by the WTRU to a network as the identifier for the WTRU. The IMSI may also be used to acquire other information regarding the WTRU in the Home Location Register (HLR). An IMSI is usually 15 digits in length. The first 3 digits are the Mobile Country Code (MCC), and is followed by the Mobile Network Code (MNC), either 2 digits (European Standard) or 3 digits (North American Standard). The remaining digits are the mobile station identification number (MSIN) within the network's customer base. IMSI based addressing provides limited connectivity but may serve as a first step in remotely activating a WTRU on a network request.

Currently, WTRUs are individually identified and authenticated via their IMSI, whereby each WTRU includes a unique IMSI. Each WTRU is authenticated, authorized and registered using its IMSI in order to have access to available resources and services. However, as the projections for the number of M2M connected devices exponentially increases, network operators may face the issue of running out of IMSI address. A need exists to authenticate a terminal by identifying the group to which it belongs rather than identifying it via its own unique Id.

Devices within a geographical area serving the same operator may be considered a single device by 3GPP. Upon a single 3GPP registration procedure, these devices may be assigned to common 3GPP radio recourses, common network resources, a common IP address and a single IMSI (i.e., a "Group IMSI" or "G-IMSI"). This G-IMSI may be used on the occasion when a plurality of WTRUs may always be addressed as a group such as for charging purposes. This would allow a single IMSI to serve many devices. This would be especially advantageous for WTRUs within the same geographical area.

Figure 2:
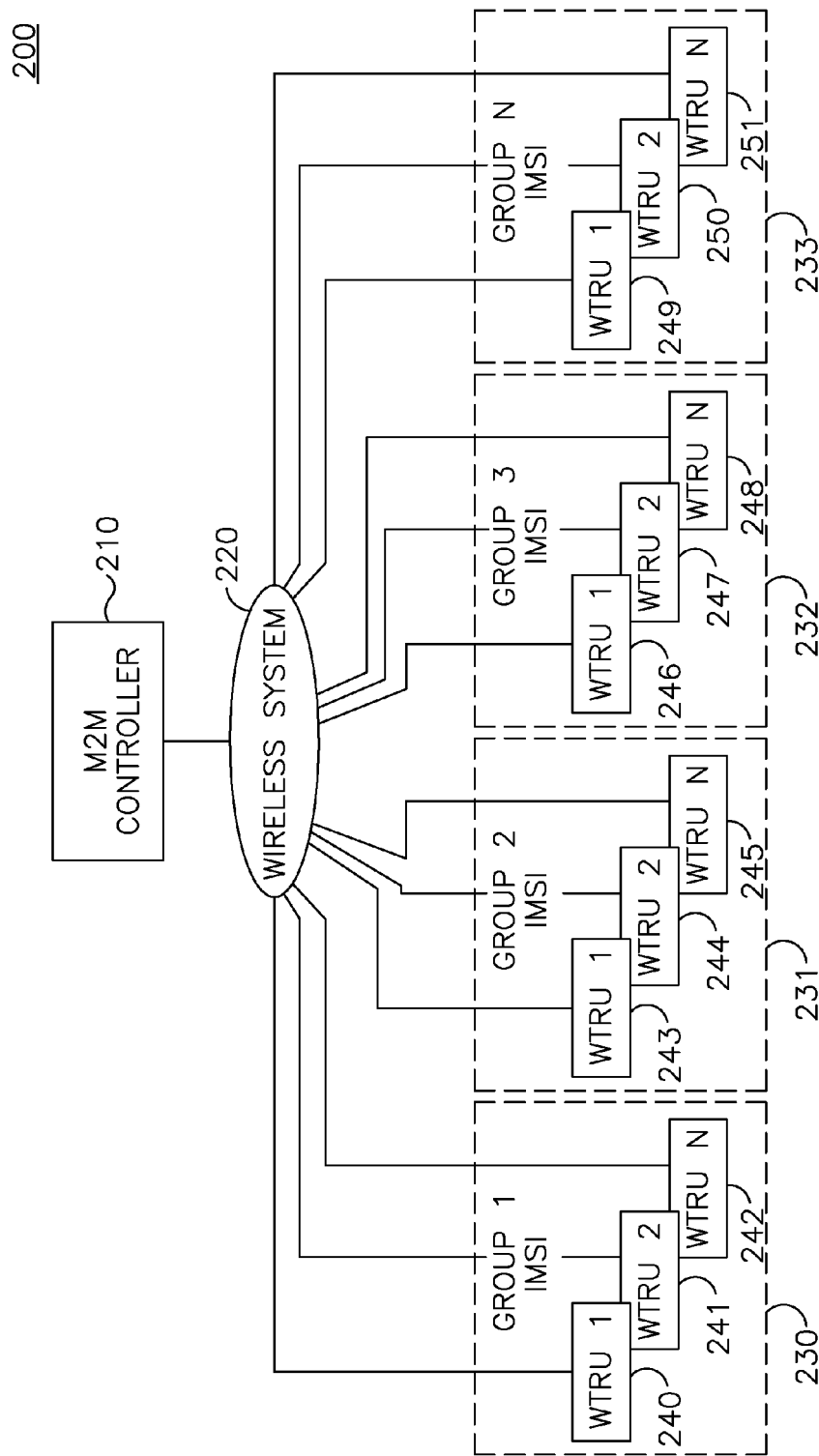
FIG. 2 is a block diagram of M2M communications between a M2M controller, a wireless system and a plurality WTRUs.

FIG. 2 is a block diagram of M2M communications 200 between a M2M controller 210, a wireless system 220 and a plurality WTRUs 240-251. The M2M controller 210 controls the plurality of WTRUs 240-251. WTRUs are installed with a SIM card that contains an IMSI. The WTRUs 240-251 are allocated to a particular IMSI group 230-233 based on a common IMSI (i.e., a G-IMSI), and their geographic location.

The assignment of the G-IMSI may be done in several ways, including: (1) an initial configuration of the devices (i.e., hard wired); (2) a SIM Card configuration; (3) over the air activation (i.e., downloading); or (4) by using Short Message Services (SMS).

Each WTRU performs a registration and authorization of its IMSI. Once registration and authentication is successful the WTRUs 240-251 may be assigned to dedicated channels for transmission and reception. The IMSI is used to access the wireless system 220 and obtain an IP address.

During a 3GPP registration procedure, the WTRU initiates the attach procedure by the transmission of an Attach Request that includes a number of information elements including the G-IMSI. The G-IMSI may be included if the WTRU does not have a valid temporary identifier (P_TMSI) available, which is assigned by the network in a previous attachment. If the WTRU has a valid P_TMSI, then the P_TMSI and the old Routing Area Identifier (RAI) where the P_TMSI is assigned, may be included.

The connection between the WTRU and the M2M controller may be established depending on the nature of the connection (i.e., IP based connection, IMS based connection, or SMS based connection). The SMS connection may be performed by sending an SMS message to the controller with the relevant data. There may not be a need to establish a new connection in this case. In a case of IP Multimedia (IMS) connection for M2M, the WTRU may establish an IP connection to the 3GPP network and may perform Session Initiation Protocol (SIP) registration and may send M2M SIP based messages to the M2M controller with any relevant data. In a case of IP based connection, the WTRU may establish an IP connection in the 3GPP system (i.e., PDP Context activation) and may perform any additional IP based registrations required by the M2M controller directly.

Once the IP address is obtained, the WTRUs 240-251 may connect to a wireless system 220. The wireless system 220 connects the WTRUs 240-251 to the M2M controller 210. The M2M controller 210 is able to communicate with each WTRU 240-251 via the WTRUs 240-251 IP address and IMSI. In addition, the M2M controller 210 is aware of which IMSI group 230-233, a WTRU 240-251 belongs. The M2M controller 210 may communicate either directly to a WTRU 240-251 or may communicate directly to a IMSI group 230-233. As a service controller and owner of these devices, the M2M controller may be aware of the 3GPP network related information pertaining to the device.

Figure 3:
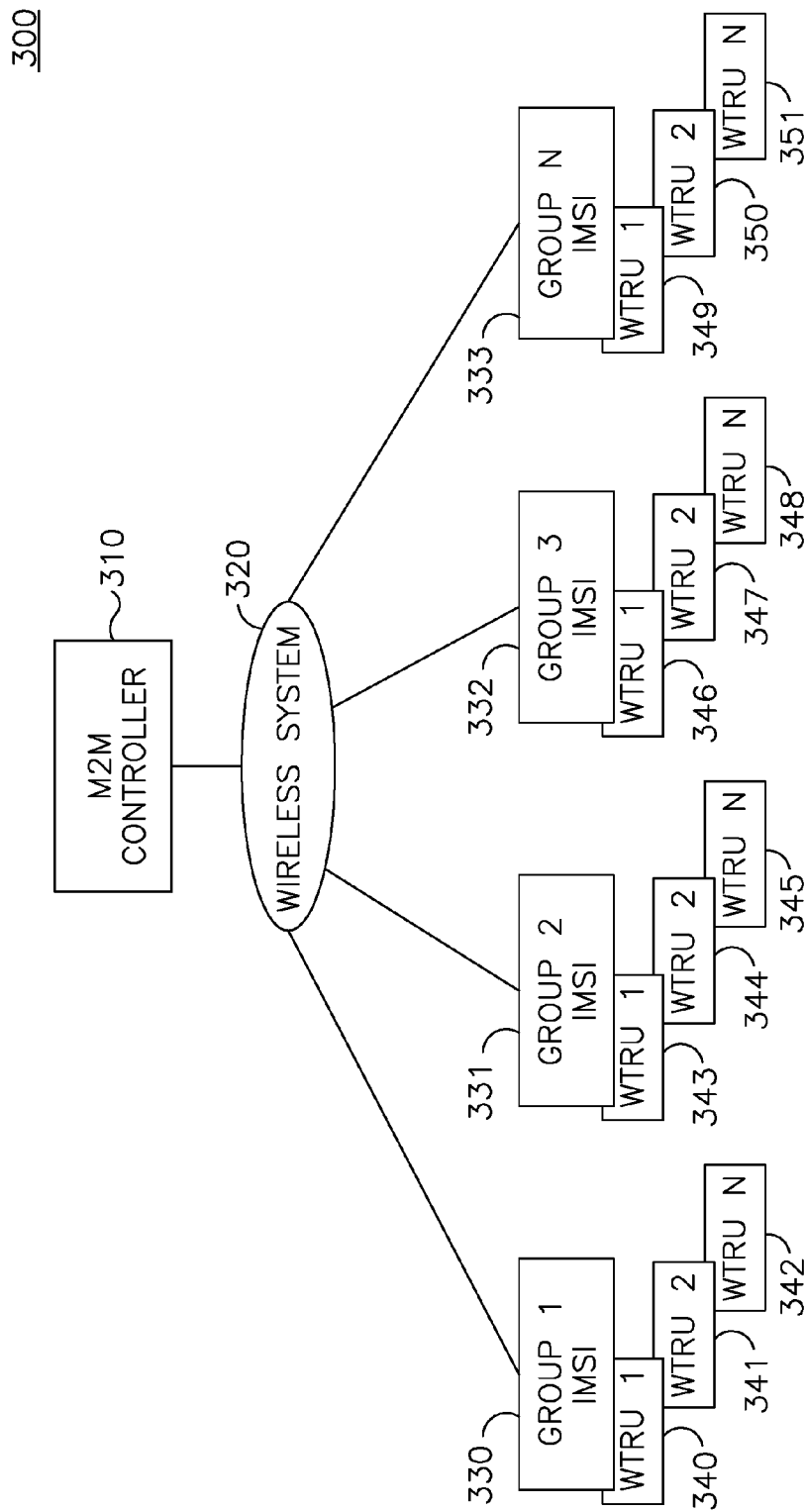
FIG. 3 is a high level block diagram of M2M communications between an M2M controller, a wireless system and a plurality of IMSI Groups.

FIG. 3 is a high level block diagram of M2M communications 300 between an M2M controller 310 and a plurality of IMSI groups 330-333. The M2M controller 310 controls each of the IMSI groups 330-333, and each IMSI group 330-333 includes one or more WTRUs 340-351. Each WTRU 340-351 within a specified IMSI group 330-333 has the same IMSI. A single authentication or initialization is performed for the IMSI group 330-333 in order for the IMSI group 330-333 to obtain an IP address. The IMSI group 330-333 may be assigned dedicated channels for transmission and reception. Once the IP address is obtained, the IMSI group 330-333 may connect to the wireless system 320. The M2M controller 310 is connected to each IMSI group 330-333 via the wireless system 320. Each of the WTRUs 340-351 within the IMSI group 330-333 may be centrally controlled and managed by the M2M controller 310 via the IMSI group 330-333, through the wireless system 320.

Figure 4:
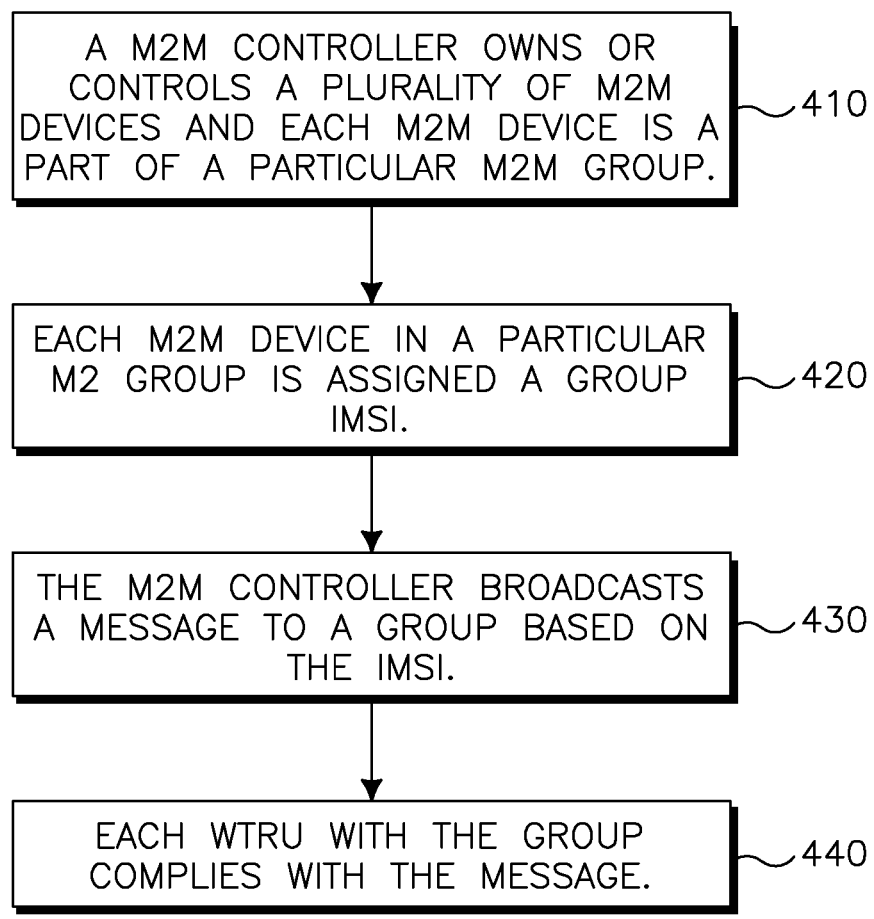
FIG. 4 is a flow diagram of M2M communications between a M2M controller and a plurality of IMSI Groups.

FIG. 4 is a flow diagram of M2M communications 400 between a M2M controller and a plurality of IMSI groups each including a plurality of WTRUs 410. Each WTRU within an IMSI group has the same G-IMSI and each group performs as a unified terminal 420. The M2M controller may page the IMSI group using the group identifier (i.e., G-IMSI) 430. Also, the individual WTRUs within the IMSI group may monitor the dedicated channel for a page or SMS message addressed to the IMSI group. Communications are broadcast from the M2M controller to each IMSI group 430. The communication may be in the form of SMS or via IP application level messages. The M2M controller may also reach each WTRU individually with a message. Each WTRU within the IMSI group complies with the message 440. In a case of a failure to acknowledge receiving certain messages, the controller may attempt to re-send the message again. If an individual WTRU does not respond, a specific message is sent with additional identifications for that device. In case of a persistent lack of response, the controller may mark the device for maintenance.

For example, an M2M controller may be a utility company and each WTRU may be a smart meter. The utility company owns a plurality of smart meters and has allocated each of the smart meters to a particular meter group. The utility company can interact with a meter group by sending a message to the group to i.e., increase power, monitor activity or turn off. All smart meters within the group receiving the message comply with the instructions from the utility company.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, MTC device, terminal, base station, RNC, or any host computer.

What is claimed is:

1. A machine-to-machine (M2M) based wireless transmit/receive unit (WTRU), comprising:
    a subscriber identity module (SIM) card, wherein the SIM card includes a group international mobile subscriber identity (G-IMSI) wherein the G-IMSI is unique to a group of M2M WTRUs
    a transmitter configured to transmit an attach request message to a network, wherein the attach request message includes the G-IMSI;
    a receiver further to receive an IP address in response to the attach request; and
    the transmitter and the receiver further configured to communicate with the network using the IP address.

2. The M2M based WTRU of claim 1 wherein the G-IMSI is a permanent identification (ID) used for accessing the wireless communication system.

3. The M2M based WTRU of claim 1 wherein the information is received in a short message service (SMS) message, session initiation protocol (SIP) message or initiation protocol (IP) message.

4. The M2M based WTRU of claim 1 wherein the group of M2M WTRUs includes a plurality of WTRUs having the same G-IMSI.

5. The M2M based WTRU of claim 1 wherein the group of M2M WTRUs is based on geographic proximity.

6. The M2M based WTRU of claim 1 wherein the WTRU communicates via internet protocol (IP) with the M2M controller.

7. The M2M based WTRU of claim 1 wherein the WTRU receives a G-IMSI.

8. A wireless communication system connecting a group of wireless transmit/receive units (WTRUs) to a machine-to-machine (M2M) controller using a group international mobile subscriber identity (G-IMSI), the M2M controller comprising:
- a transmitter configured to transmit information to the group of WTRUs wherein the information includes a G-IMSI, or its derivative, and the G-IMSI is unique to the group of WTRUs;
- a receiver configured to receive an attach request message from at least one WTRU of the group of WTRUs, the attach request message including the G-IMSI; and
- a processor configured to provide an internet protocol (IP) to each of the at least one WTRUs in response to the attach request.

9. The wireless communication system of claim 8 wherein the processor is configured to register the G-IMSI.

10. The wireless communication system of claim 8 wherein radio resources, temporary identifications, and international mobile subscriber (IMS) registrations are allocated based on the authorized G-IMSI.

11. The wireless communication system of claim 8 wherein the transmitter is configured to transmit information including short message service (SMS) messages, session initiation protocol (SIP) messages or initiation protocol (IP) messages.

* * * * *